United States Patent
Schrey et al.

(10) Patent No.: US 7,271,937 B2
(45) Date of Patent: Sep. 18, 2007

(54) METHOD AND DEVICE FOR IMAGING USING SEVERAL EXPOSURE TIMES

(75) Inventors: Olaf Schrey, Ratingen (DE); Arndt Bussmann, Wesel (DE); Markus Schwarz, Duisburg (DE); Juergen Huppertz, Duisburg (DE); Werner Brockherde, Duisburg (DE); Bedrich Hosticka, Duisburg (DE); Christian Nitta, Duisburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1004 days.

(21) Appl. No.: 10/450,938

(22) PCT Filed: Sep. 17, 2001

(86) PCT No.: PCT/EP01/10741

§ 371 (c)(1),
(2), (4) Date: Jun. 17, 2003

(87) PCT Pub. No.: WO02/052842

PCT Pub. Date: Jul. 4, 2002

(65) Prior Publication Data

US 2004/0047012 A1 Mar. 11, 2004

(30) Foreign Application Priority Data

Dec. 22, 2000 (DE) ............................... 100 64 184

(51) Int. Cl.
*H04N 1/04* (2006.01)
(52) U.S. Cl. ...................... 358/474; 358/475; 358/509; 358/514; 358/520; 358/483; 348/311; 348/226.1; 250/208.1

(58) Field of Classification Search ................ 358/474, 358/513–514, 520, 475, 509, 477, 483; 348/311, 348/226.1; 250/208.1
See application file for complete search history.

(56) References Cited

U.S. PATENT DOCUMENTS

| | | | | | |
|---|---|---|---|---|---|
| 4,471,228 | A | * | 9/1984 | Nishizawa et al. | 348/298 |
| 5,420,421 | A | * | 5/1995 | Lindgren et al. | 250/252.1 |
| 6,813,040 | B1 | * | 11/2004 | Uchino et al. | 358/1.9 |

FOREIGN PATENT DOCUMENTS

DE 37 33 074 C2 4/1989

(Continued)

*Primary Examiner*—Aung S. Moe
*Assistant Examiner*—Negussie Worku
(74) *Attorney, Agent, or Firm*—Michael A. Glenn; Glenn Patent Group

(57) ABSTRACT

In a method for imaging, a plurality of image sensor elements is used, which generate different output signal values when using different exposure times. For each image sensor element, an image signal value is generated by generating a first output signal value when using a first exposure time and an associated second output signal value using a second exposure time. If the first output signal value does not exceed a threshold value associated thereto, the image signal value is calculated using a first calculating rule on the basis of the first output signal value. If the first output signal value exceeds the threshold value, the image signal value is calculated using at least a second calculating rule on the basis of at least the second output signal value. By the calculating rules, the first and second output signal values are shifted relative to each other and adjusted such that no detectable discontinuity occurs between an image signal value still calculated according to the first calculating rule and an image signal value already calculated according to the second calculating rule.

28 Claims, 4 Drawing Sheets

FOREIGN PATENT DOCUMENTS

| | | |
|---|---|---|
| DE | 198 16 003 A1 | 11/1999 |
| EP | 1 003 329 A1 | 5/2000 |

\* cited by examiner

METHOD AND DEVICE FOR IMAGING USING SEVERAL EXPOSURE TIMES

BACKGROUND OF THE INVENTION

1. Field of the Invention

The present invention relates to a method and a device for imaging using several exposure times and a plurality of image sensor elements, such as, for example, those of an integrated CMOS semiconductor image sensor. In particular, the present invention relates to methods and devices for imaging, enabling a temperature and drift invariant adjustment of the output characteristic curves of an image sensor and, in particular, of an integrated CMOS semiconductor image sensor.

2. Description of Prior Art

For a picture record or picture detection, digital image detecting systems, in particular those using integrated CMOS semiconductor image sensors, are becoming increasingly important. In such image sensors, depending on an illumination, i.e. an incident light radiation, charge carriers are generated in a photodiode, a phototransistor or a photogate. Usually a charged capacitor is discharged by the charge carriers produced so that the discharge of the capacitor is a measure of the incident light radiation. In order to produce a signal indicating the incident light radiation or illumination the image sensor element is exposed with a predetermined exposure time, whereupon the voltage of the capacitor is sampled for reading out the image sensor element, i.e. for producing an output signal value. If there is no illumination, the sensor output signal sampled is at a maximum, while the sensor output signal sampled decreases with an increasing discharge of the capacitor and finally reaches an area of saturation. The usage of different integration times represents different amplifications so that for longer exposure times the area of saturation is already obtained at a lower sensor input signal. When short exposure times are used, the sensitivity for small sensor input signals is, however, too low.

In order to be able to obtain a greater control area, it is known in existing image acquisition systems to use different exposure times. Thus, the images obtained at the different exposure times are linked using calibration methods. For this, the quasi-linear sensor characteristic curve is passed slowly after manufacturing the sensor, i.e. before delivering to the customer, by a homogenous light source. The sensor output signals are mapped to a value by means of a look-up table, the value corresponding to a linear characteristic curve for the respective exposure time. These values are then stored in a non-volatile memory. A decisive disadvantage of this method is that characteristic curve changes occurring due to operating temperature variations and a long-time drift cannot be detected. Depending on the calibration algorithm, they can, however, deteriorate the system performance negatively, which requires a removal of the camera system, i.e. of the image record system, which may be expensive, and a recalibration. Thus, only the long-time drift can be compensated temporarily.

A further disadvantage of the image acquisition system described is that the memory requirement for storing the correction data is enormous. When calibrating, correction values relating to different output signal values of different pixels with no illumination, i.e. for an offset, and for amplification in order to map the nonlinear real characteristic curve to a linear characteristic curve must be calculated. For each possible combination of offset and amplification, the "real" output signals corresponding to the pixel output values must be stored in a look-up table. In a 1024×1024 pixel matrix having a pixel depth of 16 bits, two exposure times, i.e. amplifications, and a medium offset thus a memory requirement of four megabytes results for the look-up table. Previous realizations of highly dynamic camera systems having a multiexposure are thus only possible with considerable costs so that a practical realization of such systems has not been known.

U.S. Pat. No. 5,047,861 discloses a device for an image record with several image sensor elements, in which the output data of each image sensor element is corrected individually. For two correction values, a respective correction function is generated depending on the input image data. The correction data is stored in two allocation tables.

DE 198 16 003 A1 discloses a method for correcting the grey levels of images of a digital infrared camera. For each image sensor element of the camera, for each grey level, a correction coefficient is stored in an allocation table, wherein the image data is linearized pixel by pixel by the correction coefficient.

U.S. Pat. No. 5,420,421 relates to a method for compensating nonlinearities of an infrared image sensor having a plurality of sensor elements. Thus, for each image element, several exposure times are passed to obtain correction values. Intermediate values are produced by an interpolation.

DE 37 33 074 C2 is a circuit arrangement for a pixel-by-pixel correction of image signals of an image sensor consisting of several photo elements, in which the correction values are stored in a correction value memory. A group of characteristic curves applying to all the photo sensor elements is selected.

SUMMARY OF THE INVENTION

It is the object of the present invention to provide, with a reduced expenditure, methods and devices for imaging, making it possible to combine sensor output signals obtained at different exposure times into an image taken.

This object is achieved by a method for imaging using a plurality of image sensor elements producing different output signal values when using different exposure times, wherein an image signal value is generated for each image sensor element by means of the following steps:

a) detecting a first output signal value using a first exposure time;

b) detecting an associated second output signal value using a second exposure time;

c) if the first output signal value does not exceed a threshold value associated thereto, calculating the image signal value using a first calculating rule on the basis of the first output signal value; and d) if the first output signal value exceeds the threshold value, calculating the image signal value using at least a second calculating rule on the basis of at least the second output signal value, wherein, by the calculating rules, the first and second output signal values are shifted relative to each other and adjusted in such a way that no detectable discontinuity occurs between an image signal value still calculated according to the first calculating rule and an image signal value already calculated according to the second calculating rule, and wherein the first and second output signal values are shifted, by the calculating rules, relative to each other by an amount corresponding to a difference of the two output signal values in a region of the threshold value associated to the first output signal value.

The present invention additionally provides an image device comprising:

an image sensor having a plurality of image sensor elements producing different output signal values when using different exponent times;

means for detecting a first output signal value for each image sensor element when using a first exposure time and for detecting an associated second output signal value for each image sensor element when using a second exposure time; and image signal value producing means for producing respective image signal values for respective image sensor elements, comprising means for calculating the image signal value using a first calculating rule on the basis of the first output signal value if the first output signal value does not exceed a threshold value associated thereto, and comprising means for calculating the image signal value using at least a second calculating rule on the basis of at least the second output signal value if the first output signal value exceeds the threshold value, wherein, by the calculating rules, the first and second output signal values are shifted relative to each other and adjusted in such a way that no detectable discontinuity occurs between an image signal value still calculated according to the first calculating rule and an image signal value already calculated according to the second calculating rule, and wherein the first and second output signal values are shifted, by the calculating rules, relative to each other by an amount corresponding to a difference of the two output signal values in a region of the threshold value associated to the first output signal value.

The present invention is based on the finding that it is no longer necessary to store respective pixel output values and corresponding "linearized" values in a look-up table, which entails great memory space requirements when mathematic algorithms are used for processing the sensor characteristic curves detected at the different exposure times. Such algorithms can simply be implemented into an FPGA or CMOS image sensor (FPGA=field programmable gate array), can, however, also be implemented in any possible form, such as, for example, in DSPs (digital signal processors), in software, in the form of ASICs and the like. According to the invention, two or more images are read out subsequently at respective different exposure times. Then these images are calculated back to an exposure time. In contrast to known methods in which this information is already coded into the digital address during calibration by means of a look-up table, according to the invention the output signal values actually read out at the different exponent times are commonly processed. Thus, all the parameter variations, such as, for example, temperature changes and long-time drift, can also be detected. In addition, the processing algorithms only require a minimum of storage since only a small part of the possible sensor output data is taken for processing. The storage required can even be implemented directly in the control FPGA itself or in the CMOS memory.

According to the invention, the well-known memory intense solution approach to store calibration data when the sensor is manufactured and to use it later when detecting images is dismissed. According to the invention, an "overall characteristic curve" is rather generated by commonly processing output signal values detected at different exposure times in such a way that, at the point at which the combination of the characteristic curves virtually takes place, a continuous transition is ensured or at least such a transition that no detectable discontinuities occur in an image detected when the image signal value for a pixel is generated on the basis of the output signal value detected at the first exposure time, while, for the neighboring pixel, the output signal value is calculated on the basis of the associated second output signal value.

In order to achieve such a continuous transition, the output signal values detected at the different exposure times are calculated back to an exposure time by compensating the offset between the first and second output signal values in the area of the threshold value associated to the first output signal value, i.e. the value up to which the image signal value is produced on the basis of the first output signal value. This takes place by a relative shift of the first and second output signal values by the corresponding offset or the corresponding difference. By the shift, the individual characteristic curves associated to the first and the second output signal values, respectively, are caused to have a point of contact or intersection so that an overall characteristic curve is generated.

In order to enable an essentially continuous "overall characteristic curve" even in different long-time drifts or temperature drifts or deteriorations of image sensor elements caused by age, respectively, so that no detectable discontinuities occur, an adjustment of the characteristic curves in the area of the switching point is performed according to the invention.

According to a first embodiment, the adjustment takes place by using weighting functions in an overlapping region.

According to a second embodiment, the adjustment takes place by continuously updating the offset between the first and second output signal values, the offset between the characteristic curves associated to different exposure times being detected during operation so that variations of this offset due to long-time drifts and the like can be compensated so that an adaptive characteristic curve adjustment takes place, always guaranteeing a continuous transition at the point at which characteristic curves are combined.

According to a third embodiment, the adjustment takes place by using a continuously updated factor depending on the actual ratio of the two exposure times. For this purpose, the ratio of the amplifications with the different exposure times is detected during operation and it is taken into account when calculating the output signal values detected at the different exposure times back to an exposure time to guarantee a continuous transition at the connection point of the characteristic curves of the different exposure times.

In any case, the different gradients of the characteristic curves caused by the different exposure times can be taken into account in order not to obtain a break in the overall characteristic curve at the threshold value.

The present invention thus provides an image sensor system providing the possibility of an increased control area while saving memory requirements. Depending on the embodiment, it is only necessary to store a few data for each image element, such as, for example, the initial offset or difference between the first and second output signal values at the threshold value associated to the first output signal value and the ratio between the first and second exposure times. Alternatively, a respective adaptive adjustment of these values can occur, as will be illustrated subsequently when describing the preferred embodiments. Storage of the entire calibration information, as has been required in the prior art, is not necessary in the present invention.

The present invention can thus be employed with advantage especially in modern industrial image processing but also in vehicle applications and in the field of monitoring technology, in which highly dynamic CMOS image sensor having a very good image quality are desired. The inventive method and devices rely on the read out principle of the multiple integration or multiple exposure, respectively, and make it possible to commonly process the images taken at the different exposure times with simple algorithms and at the same time stable as regards temperature and long-time drift to form a highly dynamic image. Thus the user is in a position to be able to process highly dynamic image scenes electronically in real-time. Thus, a multitude of fields of application results, such as, for example, inspection and placing systems depending on error-free image information for a reliable object recognition and object classification, or monitoring tasks, for example in motor-vehicle interior recognition, in anti-theft systems, in road recognition systems or in pre-crash sensor technology. In the fields of application mentioned, there is a high demand of image processing systems which can react quickly regarding any situation, wherein for example in pre-cash sensor technology several hundred images per second must be provided by the camera system. Thus, the processing algorithm must not limit the image rate obtainable in the system. Thus, the demand for a simple and at the same time robust algorithm which is preferably temperature- and long-time stable results. The algorithms presented within this application can be implemented in memory matrices and generally in sensor lines and arrays.

BRIEF DESCRIPTION OF THE DRAWINGS

Preferred embodiments of the present invention will be detailed subsequently referring to the appended drawings, in which.

DESCRIPTION OF PREFERRED
EMBODIMENTS OF THE INVENTION

Figure 1:
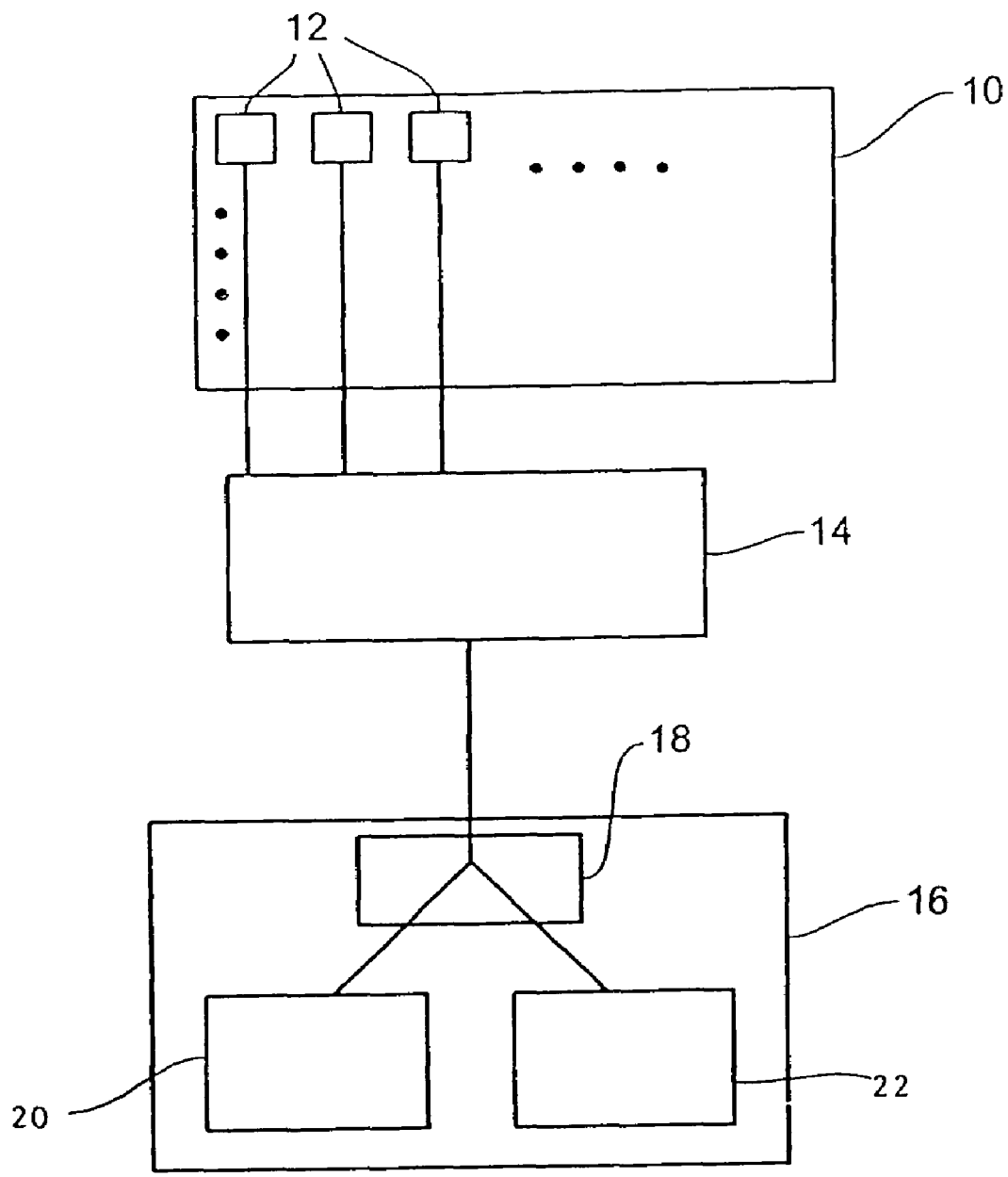
FIG. 1 is a simplified schematic illustration of an inventive imaging device.

Referring to FIG. 1, an inventive imaging device will be described generally at first, whereupon referring to FIGS. 2 to 4, special embodiments regarding the algorithms by means of which the sensor characteristic curves detected at different exposure times are processed according to the invention will be described.

The inventive imaging device, as is shown in FIG. 1, comprises an image sensor 10 having a plurality of image sensor elements 12, of which only three are schematically illustrated in FIG. 1. The image sensor 10 can, for example, be a well-known integrated CMOS semiconductor image sensor. The image sensor elements 12 are connected to detecting means 14 serving to detect output signal values of the respective image sensor elements using different exposure times. This detecting means 14 in turn is connected to image signal values generating means 16 in which the inventive algorithms for calculating the image signal values to be used for the final image are performed. In this image signal value generating means 16 an image signal value representing a pixel in the future image is generated or calculated, respectively, for each image sensor element 12.

In a preferred embodiment the detecting means 14 serves to detect a first output signal value for each image sensor element 12 using a first exposure time and to detect a second output signal value for each image sensor element 12 using a second exposure time. The image signal value generating means 16 compares the first output signal value to a pre-given threshold value $y_o$ using a comparator 18. The pre-given threshold value $y_o$ depends on the sensor characteristic curve at the first exposure time and is in a region before the area of saturation of this sensor characteristic curve, such as, for example, approximately 20% above the lower threshold of the control area so that in the area above the threshold value $y_o$ the sensor characteristic curves can be considered to be approximately linear. Alternatively, tracking means can be provided which can cause an adaptive readjustment of the threshold value $y_o$ by for example providing a device, by means of which artifacts in images taken, such as, for example, discontinuities, can be detected.

If the comparison in the comparator 18 has the result that the first output signal value is greater than the threshold value $y_o$, the image signal value for the image sensor element to which this first output signal value is associated will be generated using means 20 generating it on the basis of the first output signal value using a first calculating rule. If the comparison in the comparator 18 has the result that the first output signal value is smaller than the threshold value $y_o$, the image signal value for the corresponding image sensor element will be generated in means 22 of the image signal value generating means 16 using at least a second calculating rule on the basis of at least the associated second output signal value, wherein a relative shift and adjustment of the output signal values is caused by the calculating rules, as will be detailed subsequently referring to preferred embodiments.

Figure 2:
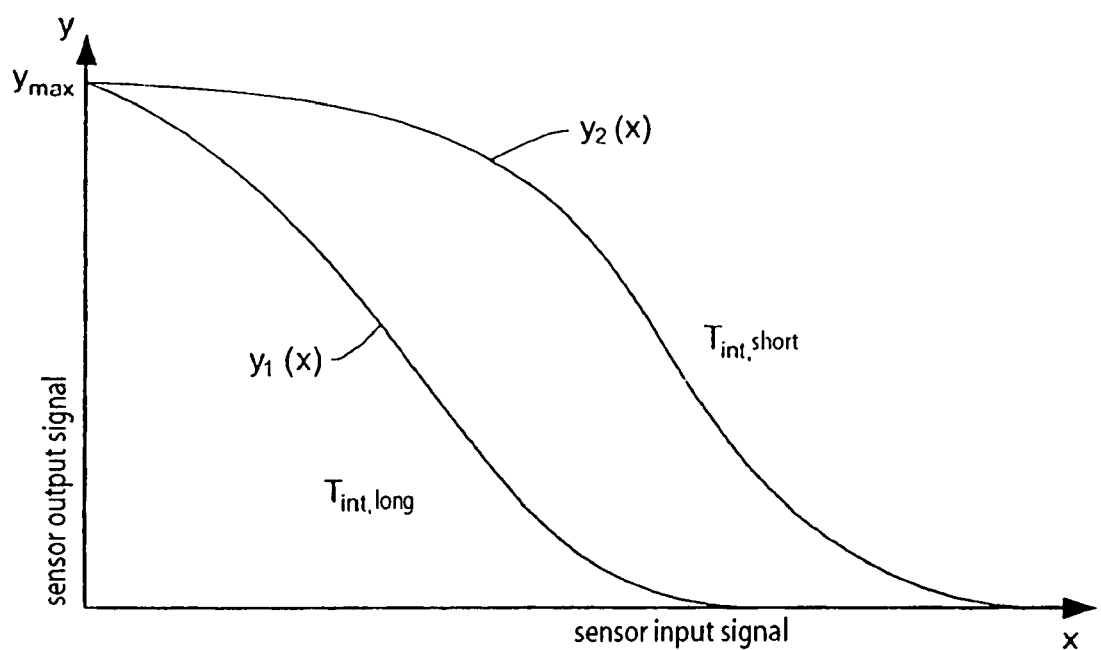
FIG. 2 is a schematic illustration of sensor characteristic curves at different exposure times.
Figure 3:
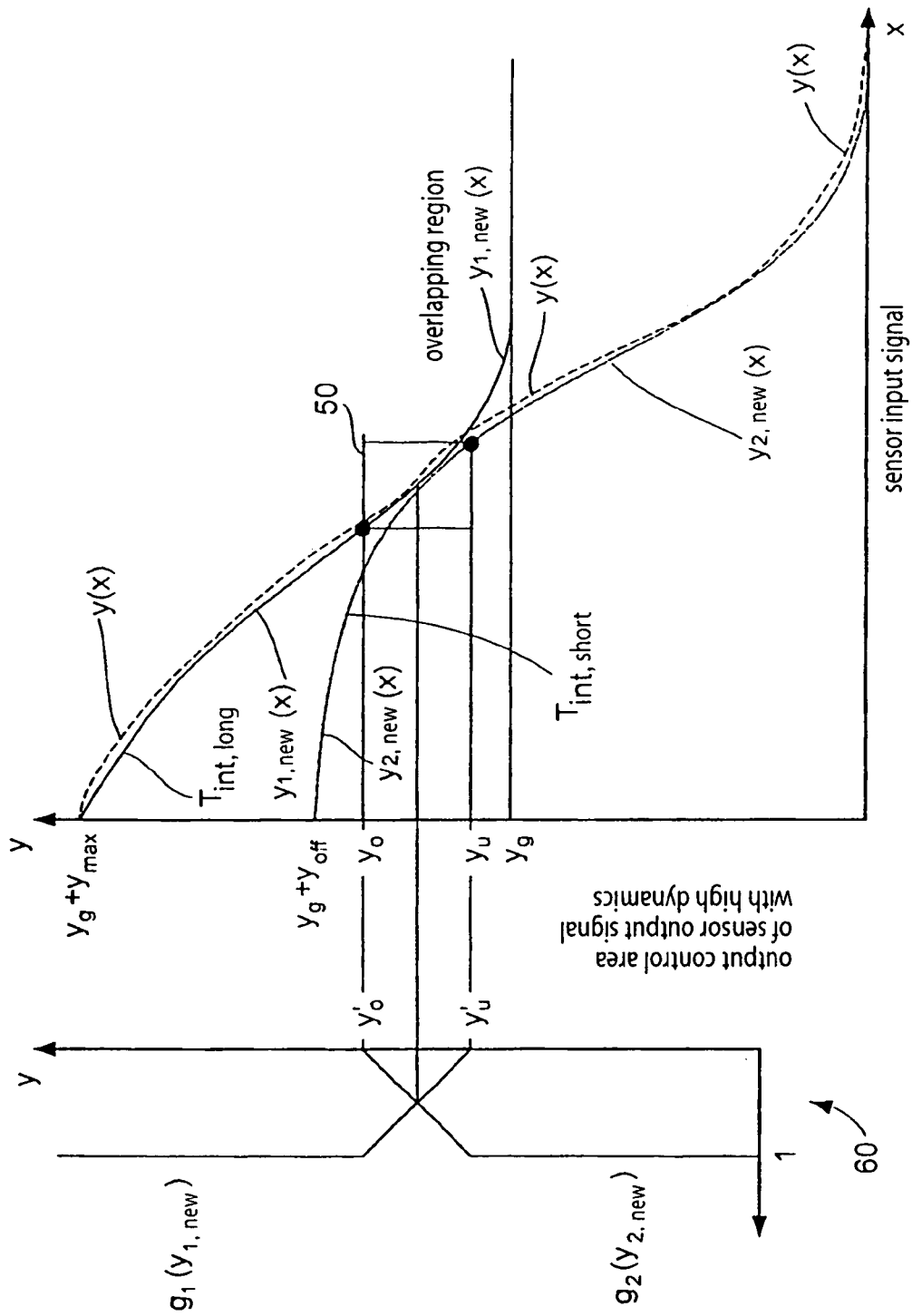
FIG. 3 is a schematic illustration for explaining a first embodiment of the present invention.
Figure 4:
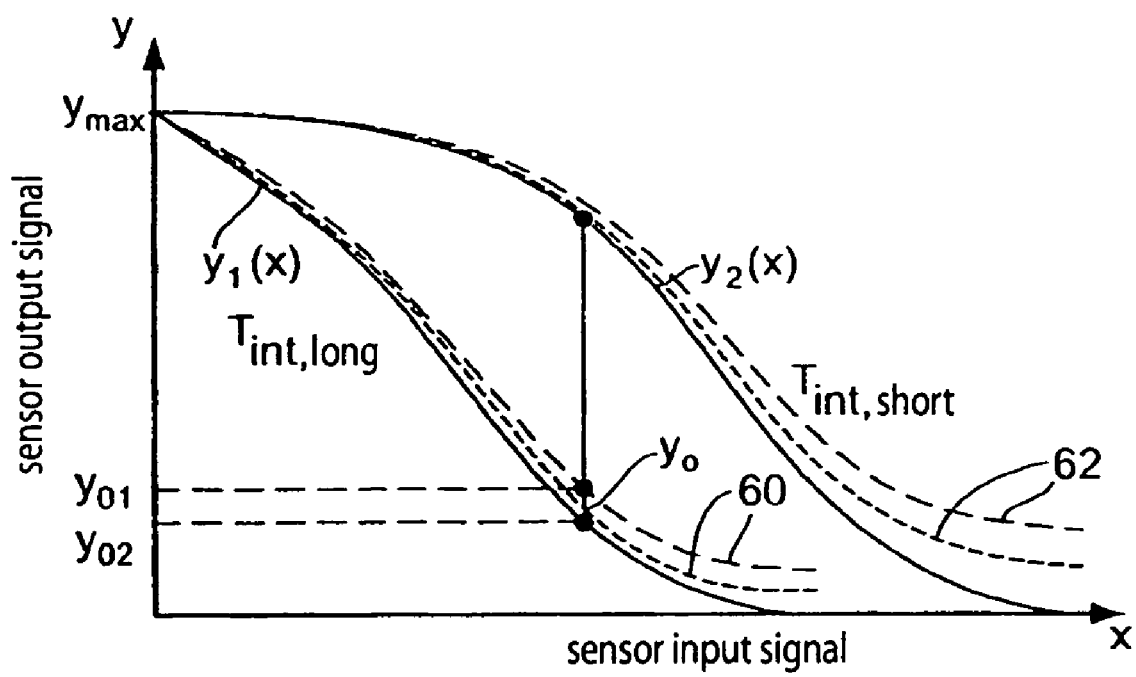
FIG. 4 is a schematic illustration for explaining another embodiment of the present invention.

Referring to FIGS. 2-4, special embodiments of algorithms which can be used according to the invention to process the sensor characteristic curves detected at different exposure times will be described.

In FIG. 2, two typical output characteristic curves of a CMOS image sensor element at two different exposure or integration times, a longer exposure time $T_{int,long}$ and a shorter exposure time $T_{int,short}$, are shown. For the longer exposure time $T_{int,long}$, the sensor element has the characteristic curve $y_1(x)$, x representing the sensor input signal, that is the illumination incident on the sensor element. For the shorter integration time $T_{int,short}$, the sensor element has the output characteristic curve $y_2(x)$. Both characteristic curves usually start at a sensor output signal $y_{max}$, $y_{max}$ corresponding to the output signal of the sensor element without any illumination. According to the invention, these output characteristic curves $y_1(x)$ and $y_2(x)$ are mapped in a resulting overall characteristic curve using corresponding calculating algorithms. Roughly speaking, the two characteristic curves are shifted relative to each other and adjusted to each other so that an overall characteristic curve having an enlarged approximately control area is formed. Expressed figuratively, the enlarged control area is obtained by attaching the part of a characteristic curve to be considered to be approximately linear to the part of the other characteristic curve to be considered to be linear, wherein the two linear areas are preferably adjusted to each other regarding the gradient. According to the invention, it is caused that at the point at which the two characteristic curves are attached to each other, there is an essentially continuous transition so that it is guaranteed in an image generated that there are no detectable brightness discontinuities representing image corruptions between neighboring pixels, the output signals of which, due to the brightness distribution, are calculated on the basis of different exposure times.

Such visible brightness discontinuities between neighboring pixels can occur when there is no continuous transition at the combination point of the two characteristic curves and the image signal value of the one pixel is still calculated on the basis of the one exposure time while the image signal value of the pixel adjacent to this pixel is already calculated on the basis of the other exposure time.

The calculating algorithms performed in the image signal value generating means according to the invention thus correspond to a mathematical combination of characteristic curves recorded at different exposure times so that on the one hand an enlarged approximately linear control area arises and on the other hand a temperature and long-time drift compensation is possible.

A first embodiment of a calculating algorithm performed in the image signal value generating means will be discussed subsequently referring to FIG. 3 in which a combined overall characteristic curve is illustrated schematically.

In FIG. 3, a characteristic curve $y_{1,new}(x)$ calculated from the output signal values $y_1(x)$ detected at the exposure time $T_{int,long}$ using a first calculating rule is illustrated as a continuous line. The characteristic curve $y_{1,new}(x)$ is formed from modified first output signal values. The first calculating rule in the embodiment illustrated is as follows:

$$y_{1,new}(x) = y_1(x) + y_g \qquad (Equ.\ 1)$$

$y_g$ corresponding to the distance or the difference of the output signal values or the overall characteristic curves $y_1(x)$ and $y_2(x)$ in the region of a threshold value $y_o$. The characteristic curve $y_{1,new}(x)$ thus has a value of $y_g + y_{max}$ when there is no illumination.

In FIG. 3, a characteristic curve $y_{2,new}(x)$ obtained from the characteristic curve $y_2(x)$ associated to the short exposure time is shown, which is combined with the characteristic curve $y_{1,new}(x)$ to form an overall characteristic curve $y_1(x)$. The characteristic curve $y_{2,new}(x)$ is illustrated in FIG. 3 in a dash-dotted way while the overall characteristic curve $y_2(x)$ is illustrated in a broken way.

A calculated modified first output signal value is used as the image signal value as long the first output signal value $y_1(x)$ does not exceed the threshold value $y_o$ associated thereto, i.e. is not below it. This is equivalent to the determination that the modified first output signal value $y_{1,new}(x)$ falls under the threshold value $y'_0$ shown in FIG. 3, wherein the following applies: $y'_0 = y_o + y_g$.

The threshold value $y_o$ can essentially be determined freely such that it is in an area of the characteristic curve $y_1(x)$ still to be considered to be approximately linear, i.e. beyond the area of saturation of this characteristic curve. The threshold value $y_o$ can, for example, be determined to be 20% above the normal control area of the characteristic curve $y_1(x)$.

As is shown in FIG. 3, in the embodiment shown, above the threshold value $y_o$, the overall characteristic curve $y(x)$ is formed by the characteristic curve $y_{1,new}(x)$. Below a threshold value $y_u$ associated to the characteristic curve $y_{2,new}(x)$, forming an overlapping region or transition region 50 together with the upper threshold value $y'_0$, the overall characteristic curve $y(x)$ is formed by the characteristic curve $y_{2,new}(x)$, the calculation of which will be illustrated subsequently. Finally, the overall characteristic curve $y(x)$ in the overlapping region 50 consists of a combination of a weighted characteristic curve $y_{1,new}(x)$ and a weighted characteristic curve $y_{2,new}(x)$, as will also be detailed subsequently. It is to be mentioned at this stage that the lower threshold value $y_u$ of the overlapping region is selected depending on the characteristic curve $y_{2,new}(x)$ such that for small sensor output signals it is within a region of it to be considered to be approximately linear, adjacent to the non-linear area.

For calculating the characteristic curve $y_{2,new}(x)$ from the characteristic curve $y_2(x)$, in the embodiment shown in FIG. 3, a constant factor between the exposure times $T_{int,long}$ and $T_{int,short}$ is used. This factor is predetermined by the exposure times programmed into the sensor from outside. Simply assuming that the curves or characteristic curves $y_1(x)$ and $y_2(x)$ are linear in the area to be considered, the following contexts apply:

$$y_1(x) = m_1 \cdot x + y_{max,1};\ y_2(x) = m_2 \cdot x + y_{max,2} \qquad (Equ.\ 2)$$

In the above equation, $m_1$ and $m_2$ describe the respective gradients when the characteristic curves $y_1(x)$ and $y_2(x)$ are considered to be linear. The values $y_{max,1}$ and $y_{max,2}$ correspond to the sensor output signals of the two characteristic curves with no illumination, i.e. for $x=0$, wherein these two values usually have an identical value $y_{max}$.

The factor between the integration times is as follows:

$$K_{21} = \frac{T_{int,long}}{T_{int,short}} \text{ and } K_{12} = \frac{T_{int,short}}{T_{int,long}} \qquad (Equ.\ 3)$$

For the case of a back-calculation from $y_2(x)$ to $y_1(x)$, the constant predetermined factor $K_{21}$ is used and inverted. In the case of a back-calculation from $y_2(x)$ to $y_1(x)$, $y_2(x)$ must be recalculated into modified second output signal values $y_{2,new}(x)$ according to the following equation:

$$y_{2,new}(x) = K_{21} \cdot (y_2(x) - y_{max,2}) + y_{off} \qquad (Equ.\ 4)$$

The above equation 4 indicates that at first the gradient of $y_2(x)$ is calculated by subtracting the value $y_{max,2}$ with a maximum control. Subsequently, the gradient $m_2$ is calculated back to the gradient $m_1$ by a multiplication by $K_{21}$. The resulting curve must then be shifted by the offset $y_{off}$ in order to obtain the extended output control area shown in FIG. 3 with high dynamics. The offset $y_{off}$ thus depends on the value $y_g$ by which the characteristic curve $y_1(x)$ has been shifted.

If, as is the case in the embodiment described, the value $y_g$ corresponds to the distance $y_{diff}$ of the two characteristic curves in the area of the threshold value $y_0$, $y_{off}$ has the value $y_{max,2}$. The context between $y_g$ and $y_{off}$ is as follows:

$$y_{off} = y_{max,2} + (y_g - y_{diff}) \qquad (Equ.\ 5)$$

Consequently, by the respective shifts performed of the characteristic curves by $y_g$ and $y_{off}$, respectively, a relative shift relative to each other by $y_{diff}$ is caused. In the embodiment shown in FIG. 3, the consequence of the relative shift is that a contact or an intersection, respectively, of the characteristic curves $y_{1,new}(x)$ and $y_{2,new}(x)$ occurs approximately in the center of the overlapping region 50.

In the embodiment shown, the selection of the value of $y_g$ has the consequence that the overall characteristic curve provides sensor output signals having the same sign for all the sensor input signals.

In the embodiment illustrated in FIG. 3, the algorithm for adjusting the output signal values obtained at the two exposure times is to adjust the characteristic curves $y_{1,new}(x)$ and $y_{2,new}(x)$ to each other in the overlapping region by programmable weighting functions $g_1(y_{1,new})$ and $g_2(y_{2,new})$. Such weighting functions are schematically illustrated in a coordinate system on the left-hand side of FIG. 3, which is designated by the reference numeral 60. As is shown, the weighting function $g_1(y_{1,new})$ at the threshold value $y'_0$, has a value of 1 and linearly decreases to a value of 0 up to the lower threshold value $y_u$. In contrast, the weighting function $g_2(y_{2,new})$, at the lower threshold value $y_u$, has a value of 1 and decreases linearly, so that it has a value of 0 at the upper threshold value $y'_0$. Apart from the linear weighting function shown, other weighting functions can of course be used, as long as it is guaranteed that a continuous connection of the two characteristic curves is caused thereby.

Using the adjustment, as has been described above, the overall characteristic curve shown in FIG. 3 results as follows. If the first output signal values $y_1(x)$ produced at the first exposure time are above $y_o$, i.e. if the values of $y_{1,new}(x)$ are above $y'_0$, the modified first output signal values $y_{1,new}(x)$ are used as image signal values. If the first output signal values $y_1(x)$ exceed the threshold value $y_o$ and if modified second output signal values $y_{2,new}(x)$ which are greater than $y_u$ are produced, the value pairs of $y_{1,new}(x)$ and $y_{2,new}(x)$ are commonly processed by means of the weighting functions $g_1(y_{1,new})$ and $g_2(y_{2,new})$. If the first output signal values $y_1(x)$ are smaller than $y_o$ and the modified second output signal values $y_{2,new}(x)$ are smaller than $y_u$, the modified second output signal values $y_{2,new}(x)$ are used as the image signals.

The complete mathematical description of the characteristic curve adjusting algorithm according to the embodiment described, yielding the overall characteristic curve $y(x)$ shown in FIG. 3, is thus as follows:

$$y(x) = \begin{cases} y_{1,new}(x) & \text{for } y_1(x) \geq y_0 \\ g_1(y_{1,new}) \cdot y_{1,new}(x) + g_2(y_{2,new}) \cdot y_{2,new}(x) & \text{for} \\ \quad y_1(x) < y_0 \text{ and } y_{2,new}(x) > y_u \\ y_{2,new}(x) \text{ for } y_1(x) < y_0 \text{ and } y_{2,new}(x) < y_u \end{cases}$$ (Equ. 6)

By means of this calculating algorithm it is guaranteed that by the addition of the characteristic curves a continuous transition between $y_{1,new}(x)$ and $y_{2,new}(x)$ is always guaranteed in the overlapping region between $y'_0$ and $y_u$, even when there are shifts of the individual characteristic curves due to temperature or age.

Apart from the adjustment, described above referring to FIG. 3, of the characteristic curves using the weighting functions, it is also possible to perform an adaptive characteristic curve adjustment by tracking the distance, i.e. the offset, between the characteristic curves at the switching point during operation. Such an algorithm for adjusting the characteristic curves for the purpose of an enlargement of the measurement range and temperature drift compensation will be explained subsequently as a second embodiment of the invention. It can be implemented in hardware and thus be implemented particularly efficiently. The solution according to this embodiment is an algorithm for efficiently calculating an overall characteristic curve from the partial characteristic curves of the different measurement ranges resulting by using different integration times and an efficient algorithm for eliminating the discontinuities of the overall characteristic curves caused by the original partial characteristic curves, i.e. the transformation of the at first discontinuous overall characteristic curve into a continuous function. Since the method according to this embodiment allows a continuous adaptation of the characteristic curve even during operation, a compensation of characteristic curve drifts, such as, for example, due to a temperature drift or to a drift due to age, is also possible. The algorithm according to this embodiment can be realized especially efficiently and simply when the measuring range switching, with the example of a CMOS sensor, the switching of the integration times, takes place in a respective ratio of 1:2, 1:4, 1:8 or, generally, $1:2^m$, m being an integer positive number. Thus, the necessity of a multiplier is eliminated in a realization on an integrated circuit or is made so simple that it can be substituted by a hard-wired bit-shift operation which can be realized by an internal wiring alone, i.e. without additional logic elements. The following equation (7) describes the formation of the overall characteristic curve from the partial characteristic curves:

$$y(nT) = \sum_{i=1}^{K} [O_i(nT) + k_i \cdot y_i(nT)] \cdot R(y_i), \text{ with}$$ (Equ. 7)

$$R(y_i) = \begin{cases} 0 & \text{for } y_i > y_{max} - \Delta_i \\ 1 & \text{for } 0 \leq y_i < y_{max} - \Delta_i \end{cases}$$

The variable nT thus indicates a respective time, wherein a sensor output signal $y_i(nT)$ corresponds to the integration time $T_{int,i}$ chosen at a time nT. This signal is calculated back via the factor $k_i$ indicating the amplification factor, i.e. the ratio of the exposure times, for two adjacent partial characteristic curves. The factors $k_i$ in turn are predetermined by the exposure times programmed into the sensor from outside. In addition, the sensor output signal $y_i(nT)$ is adjusted by $O_i(nT)$ to the adjacent characteristic curve by a respective shift. This offset $O_i(nT)$ thus indicates the respective difference of the output signal values obtained at the respective exposure times between neighboring partial characteristic curves at the switching point.

The variable $\Delta_i$ is the switching threshold from which on the output characteristic curve belonging to the next longer integration time is selected. Via the function $R(y_i)$, the input curves $y_i$ are selected one after the other from the shortest to the longest integration time. After processing, the signal $y(x)$ thus results.

As has already been indicated above, in this embodiment, the offset $O_i$ is tracked, i.e. calculated and adjusted during the operation of the sensor. In a region $>\Delta_i$ of the overlapping region between two adjacent characteristic curves $y_i$ and $y_{i+1}$, this offset $O_i$ is calculated as follows:

$$\Delta O_i(y_i(nT)) = k_i \cdot [y_{i+1}(nT) + O_{i+1}(y_{i+1}(nT))] - [$$ (Equ. 8)

$$y_i(nT) + O_i(y_i((n-1)T))] \wedge O_i(y_i((n-1)T)) =$$

$$O_i(y_i((nT)) + \Delta O_i(y_i(nT))$$

Equation (8) describes the adaptation of the offset values $O_i$ for eliminating the discontinuity positions of the overall characteristic curve at the respective switching points between partial characteristic curves. By the calculating rule according to equation (8), the amplification error in the switching point is also compensated. In equation (8), the value $\Delta O_i(y_i(nT))$ describes the tracking value for the offset $O_i(nT)$ to enable the continuous adaptation of the overall characteristic curve, i.e. avoiding discontinuity positions.

The method, described in this algorithm, for adjusting the characteristic curve for the purpose of an extension of the measurement range can be employed both for each individual pixel and globally, i.e. averaged over all the pixels in a sensor system having several sensor elements, with preferred embodiments of the invention in a CMOS semiconductor image sensor having an array of image sensor elements. In a pixel-wide application, only the offset values $O_i(y_i(nT))$ must be stored pixel by pixel, wherein only a few bits are required for this, wherein the bit number is depending on the maximum required offset size and thus on the sensor size. In contrast, in a global offset correction, only one set of offset values is stored for the overall system. The following equation demonstrates this:

$$\Delta O_i(nT) = \alpha \cdot \frac{1}{N \cdot M} \cdot \sum_{\forall \text{Pixel}} \Delta O_i(y_i(nT)), \; \alpha \in [0, 1] \quad \text{(Equ. 9)}$$

The average correction value results by calculating the average of the pixel-individual offsets $\Delta O_i$. It must be normalized to the dimension N×M of the matrix of the semiconductor image sensor elements. The value α illustrates a weighting factor enabling an adjustment of the adaptation speed depending on the scene.

Alternatively, it is possible to determine the number of positive and negative $\Delta O_i$ from equation (9) and to adapt according to their majorities. Thus, the following results:

$$\Delta \overline{O}_i(nT) = \frac{1}{N \cdot M} \cdot \sum_{\forall \text{Pixel}} \text{signo}(\Delta O_i(y_i(nT))), \quad \text{(Equ. 10)}$$

$$\text{signo}(x) = \begin{cases} -1 & \text{for } x < 0 \\ 0 & \text{for } x = 0 \\ 1 & \text{for } x > 0 \end{cases}$$

The estimating rule illustrated in equation (10) is very simple to realize in hardware since it only requires a comparator for calculating the "signo" function.

The adaptation of the offset values according to equations (7) to (10) takes place during the entire sensor operation, wherein a correction of an offset value only takes place when the sensor output signal is in a transition area $\Delta_i$, i.e. in the surroundings of a discontinuity position or in the surroundings of the measurement range limit. By this it is ensured that for this transition an adjustment of the offset values only takes place when a sensor output signal still valid in both partial characteristic curve areas, i.e. on the right-hand side and left-hand side of the transition, is present. Thus, a correction of an offset value only takes place when the sensor output signal still represents a valid signal in the two measurement ranges adjacent to the transition. The overlapping of the measurement ranges required for this is guaranteed since, because the measurement range switching, as has been described above, can be selected in a ratio of 1:2, 1:4, . . . 1:2$^m$, a ratio ensuring a partial overlapping of the measurement ranges can always be selected.

The above description of the second embodiment of a calculation algorithm relates to the usage of i different illumination or integration times.

In the following, a characteristic curve adjustment having a variable amplification will be discussed as a third embodiment of an inventive calculating algorithm. In the embodiments described above, a respective constant value $K_{21}$ and $k_i$, respectively, has been used as a factor between the output characteristic curves, the value being predetermined by the exposure times programmed into the sensor from outside.

In the third embodiment now described, the inventive adjustment of the partial characteristic curves to one other takes place by continuously re-calculating the factor indicating the different amplification between the output characteristic curves from the current data. Thus, this embodiment has the additional advantage that, apart from the advantages of the methods described before, additionally non-idealities of the sensor, such as, for example, an amplification maladjustment or a nonlinear characteristic curve performance, can also be compensated effectively.

FIG. 4 shows a characteristic curve diagram containing the characteristic curves $y_1(x)$ for an exposure time $T_{int,long}$ and $y_2(x)$ for an exposure $T_{int,short}$. The characteristic curve $y_1(x)$ illustrates the first output signal values recorded at the first exposure time, while the characteristic curve $y_2(x)$ illustrates the second output signal values recorded at the second exposure time. In FIG. 4, characteristic curves 60 deviating from $y_1(x)$ and characteristic curves 62 deviating from $y_2(x)$ illustrating the pixel-individual output characteristic curves of the individual sensor elements are shown. Based on these pixel-individual output characteristic curves, in this embodiment a tolerance band $y_{o1}$-$y_{o2}$ is defined around the threshold value $y_o$ associated to the first output signal values, which is used to calculate the amplification between the characteristic curves in the overlapping region produced by a relative shift of the characteristic curves relative to one another.

For calculating the amplification between the characteristic curves, assuming that the second output signal value $y_2(x)$ resulting from the previous or following picture record also belongs to the same irradiation strength or illumination intensity x as the first output signal value, the ratio between the two signal values is formed and stored. The above condition is met in sufficiently high image rates conventionally used. The ratio between the two signal values $y_1(x)$ and $y_2(x)$ is calculated for all the first output signal values $y_1(x)$ falling within the tolerance band $y_{o1}$-$y_{o2}$. The average value is calculated from the N ratio values $k_j$ thus resulting, which is a measure of the average amplification K between the characteristic curves $y_1(x)$ and $y_2(x)$. The mathematical description for the calculation of the average amplification K thus is as follows:

$$K = \frac{1}{N} \sum_{j=1}^{N} k_j \text{ with } k_j = \quad \text{(Equ. 11)}$$

$$\frac{y_{1,j}(x) - y_{\max,1}}{y_{2,j}(x) - y_{\max,2}} \text{ for every } y_{o2} < y < y_{o1}$$

For all the irradiation intensities $x > x_o$, i.e. for all the first output signal values $y_1(x) < y_o$, the values calculated back from $y_2(x)$ with the average amplification factor K are output or used as an image signal value, respectively. For irradiation intensities smaller than or equal to $x_o$, i.e. for first output signal values $y_1(x)$ larger than or equal to $y_o$, the values obtained with $y_1(x)$ are output or used as image signal values, respectively. Thus, the following law for forming applies to the generation of the image signal values:

$$y(x) = \begin{cases} y_1(x) + y_g & \text{for } y_1(x) \geq y_o \\ y_{\textit{off}} + K(y_2(x) - y_{\max,2}) & \text{for } y_1(x) < y_o \end{cases} \quad \text{(Equ. 12)}$$

When a characteristic curve adjustment with a variable amplification according to equation (12) is used, the usage of weighting functions as with the first embodiment described or the tracking of the offset value during operation, respectively, is not required to effect a continuous transition between the characteristic curves at the switching point. In contrast, according to this embodiment the continuous transition, apart from the relative shift by $y_g$, is effected by the adjustment of the ratios between the two characteristic curves, i.e. the calculation of the respective average amplification.

An even more robust operation of this algorithm according to the third embodiment can be obtained when the illumination $x_o$ associated to the threshold value $y_o$ is shifted during operation or the area $y_{o1}$-$y_{o2}$ is adjusted such that the variance of the ratios $k_j$ becomes minimal. For this, other criteria can be taken into consideration alternatively or additionally. When more than two integration times are used, the amplification factors K belonging to the respective curves must be multiplied when calculating back to the longest integration time.

The algorithms described above for producing image signal values on the basis of at least two output signal values detected with different exposure times, compared to well-known methods, have the advantage that a camera system once delivered does not have to be calibrated again. In addition, it is possible to detect and compensate tolerances, due to the age, of the individual image element parameters and of the analog read out signal path. For this, in the first embodiment described, the width of the overlapping region can additionally be adjusted adaptively. In the second embodiment described, the compensation takes place via the adaptive characteristic curve adjustment using the offset calculation, while in the third embodiment this compensation takes place by the adaptive amplification calculation. Thus, according to the invention, the flexibility of the camera system is maintained, which plays a decisive role for the reliability of camera systems in automobile, monitoring and control applications.

In addition, the inventive algorithms can be programmed very easily and thus with little memory expenditure. Some fast FIFO memories in FPGA or even directly on the CMOS image sensor IC (IC=integrated circuit) are sufficient in order to calculate the currently detected output values back to the characteristic curve desired. In the same way, the multipliers of the illumination function can be stored in the FPGA itself in the first embodiment. Alternatively, the algorithms introduced, apart from FPGA and IC based systems, can be realized in any system environment possible for an implementation of the algorithm, such as, for example, PC environments or DSP environments. The storage of calibration data for each image element, as has been required according to the prior art, is no longer required according to the invention.

An even smaller memory expenditure is required with the second algorithm described having an adaptive amplification adjustment. In this case, only the currently calculated amplification between the two characteristic curves and the shift value must be stored.

Although preferred embodiments of the present invention have been described above exemplarily, it can be understood by those skilled in the art that the algorithms described can be expanded or modified, respectively, at will or be transferred to another hardware or software, respectively. In the case of the weighted addition of the characteristic curve values in the overlapping area according to the first embodiment it is, for example, possible that the system or software developer determines whether he wants to operate pixel-individually or globally, i.e. with an average characteristic curve valid for all the pixels. A pixel-individual operation results in a greater memory expenditure which is, however, far below that of conventional methods. Even in the third embodiment described, the calculation of the amplification can be calculated pixel-individually or globally, i.e. averaged over all the pixels or image sensor elements. In addition, the methods described can easily be expanded to the usage of more than two exposure times, wherein in this regard reference is for example made to the mathematical derivation described referring to the second embodiment. Thus, it must be kept in mind that when using a higher number of exposure times, the precision of the amplification calculation, for example, becomes smaller since the word width of the analog/digital transducer used is usually fixed.

The present invention can be applied to all the electronic circuit and sensor realizations or principals for an image acquisition and is especially suitable for the usage with photodiodes, phototransistors and photogates.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for imaging using a plurality of image sensor elements generating different output signal values when using different exposure times, an image signal value for each image sensor element being generated by means of the following steps:
    (a) detecting a first output signal value when using a first exposure time;
    (b) detecting an associated second output signal value when using a second exposure time;
    (c) if the first output signal value does not exceed a threshold value associated thereto, calculating the image signal value using a first calculating rule on the basis of the first output signal value; and
    (d) if the first output signal value exceeds the threshold value, calculating the image signal value using at least a second calculating rule on the basis of at least the second output signal value,
        wherein, by the calculating rules, the first and second output signal values are shifted relative to each other and adjusted such that no detectable discontinuity occurs between an image signal value still calculated according to the first calculating rule and an image signal value already calculated according to the second calculating rule, and
        wherein the first and second output signal values are shifted, by the calculating rules, relative to each other by an amount corresponding to a difference of the two output signal values in a region of the threshold value associated to the first output signal value.

2. The method according to claim 1, wherein, by the first calculating rule, a modified first output signal value is generated by adding a constant to the first output signal value.

3. The method according to claim 2, wherein, by the second calculating rule, a modified second output signal value calculated back to the first exposure time is generated.

4. The method according to claim 3, wherein the modified first output signal value is used as an image signal value when the first output signal value does not exceed the threshold value associated thereto, wherein the modified second output signal value is used as an image signal value when the first output signal value exceeds the threshold value associated thereto and the modified second output signal value exceeds a threshold value associated thereto, and wherein a combination of a weighted modified first output signal value and a weighted modified second output signal value is used as an image signal value when the first output signal value exceeds the threshold value associated thereto and the modified second output signal value exceeds the threshold value associated thereto.

5. The method according to claim 4, wherein image signal values y(x) are calculated according to the following rule:

$$y(x) = \begin{cases} y_{1,new}(x) & \text{for } y_1(x) \geq y_0 \\ g_1(y_{1,new}) \cdot y_{1,new}(x) + g_2(y_{2,new}) \cdot y_{2,new}(x) & \text{for } \\ & y_1(x) < y_0 \text{ and } y_{2,new}(x) > y_u \\ y_{2,new}(x) & \text{for } y_1(x) < y_0 \text{ and } y_{2,new}(x) < y_u \end{cases}$$

wherein $y_{1,new}(x)$ is the modified first output signal value;

$y_1(x)$ is the first output signal value;

$y_{2,new}(x)$ is the modified second output signal value;

$g_i(y_{1,new})$ and $g_2(y_2,new)$ are weighting functions;

$y_o$ is the threshold value associated to the first output signal value; and $y_u$ is the threshold value associated to the modified second output signal value.

6. The method according to claim 5, wherein when generating the modified second output signal value a factor depending on the ratio of the first exposure time to the second exposure time is taken into account.

7. The method according to claim 6, wherein the modified second output signal value $y_{2,new}(x)$ is calculated according to the following equation:

$$y_{2,new}(x) = K_{21} \cdot (y_2(x) - y_{max,2}) + y_{off} \quad \text{(Equ. 4)}$$

wherein $K_{21}$ is the ratio between the exposure times $T_{int,long}$, $T_{int,short}$;

$y_2(x)$ is the second output signal value;

$y_{max,2}$ is the second output signal value without any illumination; and $y_{off}$ is a value depending on the constant $y_g$ added to the first output signal value $y_1(x)$.

8. The method according to claim 7, wherein the constant $y_g$ and the value $y_{off}$ have the following relation:

$$y_{off} = y_{max,2} + (y_g - y_{diff}) \quad \text{(Equ. 5)}$$

wherein $y_{diff}$ corresponds to a difference of the first and second output signal values in the area of the threshold value associated to the first output signal value.

9. The method according to claim 1, wherein for shifting and adjusting by the calculating rules a shift of the first and second output signal values relative to each other is caused, the amount of which corresponds to a difference between the first output signal value and the second output signal value in the region of the threshold value associated to the first output signal value, wherein the difference for adjusting the first and second output signal values is updated on the basis of first and second output signal values detected in the area of the threshold value associated to the first output signal value.

10. The method according to claim 9, wherein for adjusting the first and second output signal values a factor depending on the ratio of the first exposure time to the second exposure time is additionally taken into account.

11. The method according to claim 1, wherein for shifting and adjusting by the calculating rules a shift of the first and second output signal values relative to each other is caused, the amount of which corresponds to a difference between the first output signal value and the second output signal value in the area of the threshold value associated to the first output signal value, and for adjusting the first and second output signal values a factor depending on the ratio of the exposure times is used, wherein the factor depending on the ratio of the exposure times is updated on the basis of first and second output signal values detected which are within a predetermined interval of signal values.

12. The method according to claim 11, wherein the factor K depending on the ratio of the exposure times is determined according to the following equation:

$$K = \frac{1}{N} \sum_{j=1}^{N} k_j \text{ with } k_j = \frac{y_{1,j}(x) - y_{max,1}}{y_{2,j}(x) - y_{max,2}}$$

for every $y_{o2} < y < y_{o1}$ wherein $y_{1,j}(x)$ are the first output signal values in the interval between $y_{o1}$ and $y_{o2}$;

$y_{2,j}(x)$ are the second output signal values associated to the values $y_{1,j}(x)$;

$y_{max,1}$ is the first output signal value without any illumination; and $y_{max,2}$ is the second output signal value without any illumination.

13. The method according to claim 12, wherein the image signal values y(x) are calculated in steps (c) and (d) as follows:

$$y(x) = \begin{cases} y_1(x) + y_g & \text{for } y_1(x) \geq y_o \\ y_{off} + K(y_2(x) - y_{max,2}) & \text{for } y_1(x) < y_o \end{cases}$$

wherein $y_1(x)$ is the first output signal value;

$y_g$ is a constant;

$y_2(x)$ is the associated second output signal value; and $y_{off}$ is a value depending on the constant $y_g$ added to the first output signal value $y_1(x)$.

14. The method according to claim 13, wherein the constant $y_g$ and the value $y_{off}$ have the following relation:

$$y_{off} = y_{max,2} + (y_g - y_{diff}). \quad \text{(Equ. 5)}$$

15. An imaging device comprising:
an image sensor having a plurality of image sensor elements generating different output signal values when using different exposure times;
means for detecting a first output signal value for each image sensor element when using a first exposure time and for detecting an associated second output signal value for each image sensor element when using a second exposure time; and
image signal value generating means for generating respective image signal values for respective image sensor elements, comprising means for calculating the image signal value using a first calculating rule on the basis of the first output signal value if the first output signal value does not exceed a threshold value associated thereto, and comprising means for calculating the image signal value using at least a second calculating rule on the basis of at least the second output signal value if the first output signal value exceeds the threshold value
wherein, by the calculating rules, the first and second output signal values are shifted relative to each other and adjusted such that no detectable discontinuity occurs between an image signal value still calculated according to the first calculating rule and an image signal value already calculated according to the second calculating rule, and
wherein the first and second output signal values are shifted relative to each other, by the calculating rules, by an amount corresponding to a difference of the two output signal values in a range of the threshold value associated to the first output signal value.

16. The device according to claim 15, comprising means for generating a modified first output signal value by adding a constant to the first output signal value by the first calculating rule.

17. The device according to claim 16, comprising means for generating a modified second output signal value calculated back to the first exposure time by the second calculating rule.

18. The device according to claim 17, comprising means for using the modified first output signal value as an image signal value if the first output signal value does not exceed the threshold value associated thereto, for using the modified second output signal value as an image signal value if the first output signal value exceeds the threshold value associated thereto and the modified second output signal value exceeds a threshold value associated thereto, and for using a combination of a weighted modified first output signal value and a weighted modified second output signal value as an image signal value if the first output signal value exceeds the threshold value associated thereto and the modified second output signal value exceeds the threshold value associated thereto.

19. The device according to claim 18, comprising means for calculating image signal values $y(x)$ according to the following rule:

$$y(x) = \begin{cases} y_{1,new}(x) & \text{for } y_1(x) \geq y_0 \\ g_1(y_{1,new}) \cdot y_{1,new}(x) + g_2(y_{2,new}) \cdot y_{2,new}(x) & \text{for } y_1(x) < y_0 \text{ and } y_{2,new}(x) > y_u \\ y_{2,new}(x) & \text{for } y_1(x) < y_0 \text{ and } y_{2,new}(x) < y_u \end{cases} \quad \text{(Equ. 6)}$$

wherein
$y_{1,new}(x)$ is the modified first output signal value;
$y_1(x)$ is the first output signal value;
$y_{2,new}(x)$ is the modified second output signal value;
$g_1(y_{1,new})$ and $g_2(y_{2,new})$ are weighting functions;
$y_o$ is the threshold value associated to the first output signal value; and
$y_u$ is the threshold value associated to the modified second output signal value.

20. The device according to claim 19, comprising means for accounting for a factor depending on the ratio of the first exposure time to the second exposure time when generating the modified second output signal value.

21. The device according to claim 20, comprising means for calculating the modified second output signal value $y_{2,new}(x)$ according to the following equation:

$$y_{2,new}(x) = K_{21} \cdot (y_2(x) - y_{max,2}) + y_{off} \quad \text{(Equ. 4)}$$

wherein
$K_{21}$ is the ratio between the exposure times $T_{int,long}$, $T_{int,short}$;
$y_2(x)$ is the second output signal value;
$y_{max,2}$ is the second output signal value without any illumination; and
$y_{off}$ is a value depending on the constant $y_g$ added to the first output signal value $y_1(x)$.

22. The device according to claim 21, wherein the constant $y_g$ and the value $y_{off}$ have the following relation:

$$y_{off} = y_{max,2} + (y_g - y_{diff}) \quad \text{(Equ. 5)}$$

wherein
$y_{diff}$ corresponds to a difference of the first and second output signal values $(y_1(x), y_2(x))$ in the area of the threshold value $(y_o)$ associated to the first output signal value.

23. The device according to claim 15, comprising means for causing a shift of the first and second output signal values relative to each other by the calculating rules, wherein the amount of the shift corresponds to a difference between the first output signal value and the second output signal value in the region of the threshold value associated to the first output signal value, wherein the difference for adjusting the first and second output signal value is updated on the basis of first and second output signal values detected in the area of the threshold value associated to the first output signal value.

24. The device according to claim 23, comprising means for accounting for a factor depending on the ratio of the first exposure time to the second exposure time for adjusting the first and second output signal values.

25. The device according to claim 15, comprising means for causing a shift of the first and second output signal values relative to each other by the calculating rules, wherein the amount of the shift corresponds to a difference between the first output signal value and the second output signal value in the region of the threshold value associated to the first output signal value, and for adjusting the first and second output signal values a factor depending on the ratio of the exposure times is used, wherein the factor depending on the ratio of the exposure times is updated on the basis of the detected first and second output signal values within a predetermined interval of signal values.

26. The device according to claim 25, comprising means for determining the factor K depending on the ratio of the exposure times according to the following equation:

$$K = \frac{1}{N}\sum_{j=1}^{N} k_j \text{ with } k_j = \frac{y_{1,j}(x) - y_{max,1}}{y_{2,j}(x) - y_{max,2}}$$

for every $y_{o2} < y < y_{o1}$ wherein $y_{1,j}(x)$ are the first output signal values in the interval between $y_{o1}$ and $y_{o2}$;

$y_{2,j}(x)$ are the second output signal values associated to the values $y_{1,j}(x)$;

$y_{max,1}$ is the first output signal value without any illumination; and $y_{max,2}$ is the second output signal value without any illumination.

27. The device according to claim 26, comprising means for calculating the image signal values y(x) according to the following rule:

$$y(x) = \begin{cases} y_1(x) + y_g & \text{for } y_1(x) \geq y_o \\ y_{off} + K(y_2(x) - y_{max,2}) & \text{for } y_1(x) < y_o \end{cases}$$

wherein $y_1(x)$ is the first output signal value;

$y_g$ is a constant;

$y_2(x)$ is the associated second output signal value; and $y_{off}$ is a value depending on the constant $y_g$ added to the first output signal value $y_1(x)$.

28. The device according to claim 27, wherein the constant $y_g$ and the value $y_{off}$ have the following relation:

$$y_{off} = y_{max,2} + (y_g - y_{diff}). \tag{Equ. 5}$$

* * * * *